United States Patent [19]

Miyazawa et al.

[11] Patent Number: 5,143,542
[45] Date of Patent: Sep. 1, 1992

[54] PROCESS FOR PRODUCING MAGNETIC METAL POWDER FOR MAGNETIC RECORDING

[75] Inventors: Kokichi Miyazawa, Suzuka; Masatsuyo Maruo, Moriyama; Toshihiko Kawamura, Shiga, all of Japan

[73] Assignee: Ishihara Sangyo Kaisha, Ltd., Osaka, Japan

[21] Appl. No.: 631,365

[22] Filed: Dec. 20, 1990

[30] Foreign Application Priority Data

Dec. 22, 1989 [JP] Japan .................. 1-334547

[51] Int. Cl.$^5$ .................. B22F 9/22
[52] U.S. Cl. .................. 75/349; 148/105
[58] Field of Search .................. 75/349; 148/105

[56] References Cited

U.S. PATENT DOCUMENTS

| 4,165,232 | 8/1979 | Jaeckh et al. .................. 75/349 |
| 4,344,791 | 8/1982 | Steck et al. .................. 75/349 |

FOREIGN PATENT DOCUMENTS

| 0101591 | 2/1984 | European Pat. Off. . |
| 0304054 | 2/1989 | European Pat. Off. . |
| 54-42832 | 12/1979 | Japan . |
| 55-97028 | 7/1980 | Japan . |
| 56-38405 | 4/1981 | Japan . |
| 57-106526 | 7/1982 | Japan . |
| 58-48611 | 3/1983 | Japan . |
| 58-48612 | 3/1983 | Japan . |
| 58-159313 | 9/1983 | Japan .................. 75/349 |
| 58-53689 | 11/1983 | Japan . |
| 59-5603 | 1/1984 | Japan . |
| 59-19964 | 5/1984 | Japan . |
| 59-107902 | 6/1984 | Japan . |
| 59-32881 | 8/1984 | Japan . |
| 61-88505 | 5/1986 | Japan . |
| 61-174304 | 8/1986 | Japan . |
| 62-259406 | 11/1987 | Japan .................. 75/349 |
| 64-84601 | 3/1989 | Japan . |
| 1-22968 | 4/1989 | Japan . |

*Primary Examiner*—George Wyszomierski
*Attorney, Agent, or Firm*—Cushman, Darby & Cushman

[57] ABSTRACT

The present invention provides a process for producing magnetic metal powder for magnetic recording using a metal compound mainly composed of a hydrous iron oxide on an iron oxide, characterized in that prior to subjecting the metal compound mainly composed of a hydrous iron oxide or an iron oxide to a reduction treatment, addition of a boron compound and a heat treatment at 350°–750° C. in a gas atmosphere having a water vapor partial pressure of 10 mmHg or higher are carried out. When a heat treatment at 550°–900° C. in a non-reducing atmosphere is carried out in combination with the above heat treatment, the effect of the present invention is further increased.

19 Claims, No Drawings

PROCESS FOR PRODUCING MAGNETIC METAL POWDER FOR MAGNETIC RECORDING

BACKGROUND OF THE INVENTION

1. Field of the Invention

The present invention relates to a process for producing a magnetic metal powder suitable for magnetic recording.

2. Description of Related Art

Recently, a magnetic recording medium is increasingly required to be improved in recording density, to be smaller in size and to be higher in performance. Thus, attention has been paid to an iron or iron-based alloy powder (hereinafter referred to as "magnetic metal powder") which is higher in saturation magnetization and coercivity than a magnetic iron oxide powder as a magnetic powder for magnetic recording. The magnetic metal powder is now being put into practical use for digital audio tapes or 8-mm video tapes. Recently, it has been expected to apply the magnetic metal powder to high performance recording mediums such as high image quality video tapes and high recording density disks.

Recently, magnetic metal powders for high performance magnetic recording, particularly when the powders are comprised of, for example, acicular particles, are required to be so fine that the particles have a major axis of less than about 0.5 μm, particularly, less than about 0.3 μm and contain no sintered particles. In addition, in order to attain the enhancement of S/N ratio of recording medium, finer particles are required. For this purpose, it has become further important to reduce the size of crystallites (hereinafter referred to as "Lc") which constitute the acicular particles as well as to reduce the size of the acicular particles. Furthermore, when such finer powders are used as a magnetic paint, they are required to have further superiority in dispersibility, orientability, packing property and surface smoothness of coatings, when coated. However, magnetic powders are apt to be damaged in dispersibility and packing property as the powders are made finer. Therefore, in order to make the magnetic iron metal powder finer without damaging the dispersibility and packing property of the powder, it is desired to use hydrous iron oxides or iron oxides in a fine form and of a good particle size distribution as the starting material. However, the finer the starting material, the greater a tendency to make a change in the acicular form owing to intraparticle sintering, or to cause crosslinking or growing of particles owing to interparticle sintering during the reduction for obtaining the final products, which considerably has an adverse effect on the magnetic characteristics of the products.

Hitherto, various methods have been proposed to solve the problems as mentioned above. Of them, a method has usually been carried out in which various deformation-preventing agents are adhered by coating or mixing onto the surface of the hydrous iron oxides or iron oxides and then these oxides are subjected to the heat treatment for reduction. As the deformation-preventing agent have been proposed to use a silicon compound, aluminum compound, a combination of the aluminum compound and the silicon compound, or a boron compound (see Japanese Patent KOKOKU (Post-Exam. Publn.) Nos. Sho 54-42832, Sho 59-32881, Sho 59-19964 and Hei 1-22968 and Japanese KOKAI (Laid-Open) Nos. Sho 57-106526, Sho 58-48611, Sho 58-48612, Sho 59-5603, Sho 61-88505, Sho 61-174304 and Sho 64-84601). It has also been proposed to subject the particles to a tempering at high-temperature or a heat treatment in a steam containing atmosphere prior to the reduction to obtain magnetic metal powders, or subject the particles reduced to magnetite to the heat treatment, thereby retaining the acicular form of the crystals in the starting material or inhibiting the sintering of particles. However, there are still many problems which have to be solved, although the proposed methods can inhibit the deformation of the particle form and the interparticle sintering to some extent: such problems are that the progress of the reduction is easily hindered; the treatments are complicated; costs are increased; the amount of the form-retaining agent to be coated or deposited is variable depending upon the treating conditions, thereby causing variation in the magnetic characteristics of the resulting magnetic metal powders; or the shape of particles as substrate is broken or the particles are ruptured in the course of the deposition of the deformation-preventing agent by mixing with the particles.

SUMMARY OF THE INVENTION

The object of the present invention is to provide a process by which a magnetic metal powder for magnetic recording can be industrially advantageously produced without any of the problems above.

According to the present invention, the following processes are provided:

a process for producing a magnetic metal powder by reducing a metal compound composed mainly of hydrous iron oxides or iron oxides, characterized by comprising the steps of adding a boron compound to the metal compound and of heat treating the metal compound in a gas atmosphere having a water vapor partial pressure of 10 mmHg or higher at a temperature of 350°–750° C., prior to the reduction;

the process mentioned above which comprises adding the boron compound to the metal compound composed mainly of the hydrous iron oxides or iron oxides, heat treating the metal compound containing the boron compound added thereto in a gas atmosphere at a temperature of 350°–750° C., and then reducing the heated metal compound;

a process for producing a magnetic metal powder by reducing a metal compound composed mainly of hydrous iron oxides or iron oxides, characterized by comprising the steps of adding a boron compound to the metal compound, of heat treating the metal compound in a gas atmosphere having a water vapor partial pressure of 10 mmHg or higher at a temperature of 350°–750° C., and of heat treating the metal compound prior to the reduction;

the process mentioned above which comprises adding a boron compound to the metal compound, heat treating the metal compound in a gas atmosphere having a water vapor partial pressure of 10 mmHg or higher at a temperature of 350°–750° C., heat treating the metal compound in a non-reducing atmosphere at a temperature of 550°–900° C., and then reducing the heated metal compound;

the process mentioned above in which the particle shape of the metal compound is in an acicular form and the particle shape of the magnetic metal powder is also in an acicular form;

the process mentioned above in which the gas atmosphere comprises an inert gas having a water vapor partial pressure of 10 mmHg or higher;

the process mentioned above in which the boron compound is boric acid;

the process mentioned above in which the metal compound is comprised of the hydrous iron oxide in an acicular form having a specific surface area of 55 m$^2$/g or higher and an average major axis length of 0.1–0.25 μm; and the process mentioned above in which the metal compound is comprised of the iron oxide in an acicular form having a specific surface area of 40 m$^2$/g or higher and an average major axis length of 0.1–0.25 μm.

DETAILED DESCRIPTION OF PREFERRED EMBODIMENTS

The inventors have conducted intensive research in an attempt to solve the problems above, and paid their attention to the reduction of a metal compound composed mainly of hydrous iron oxides or iron oxides on which a boron compound was coated or deposited for the purpose of enhancing S/N ratio by decreasing Lc of the magnetic metal particles and producing fine particles. As a result, the following has been found: that is, when prior to subjecting the hydrous iron oxides or iron oxides to the reduction, a boron compound is added to the hydrous iron oxides or iron oxides and the metal compound is subjected to the heat treatment in a gas atmosphere having a specific water vapor partial pressure, the reduction can easily proceed, the deformation of the shape of the metal particles or interparticle sintering can substantially be avoided, dense magnetic metal powders having a small Lc which are very suitable for magnetic recording mediums for high recording density can be obtained; and further when a heat treatment is carried out in a non-reducing atmosphere together with the treatments as mentioned above, the properties as mentioned above can be further improved.

According to the present invention, a boron compound is added to substrate particles comprising a metal compound composed mainly of hydrous iron oxides or iron oxides or a metal compound having a silicon compound and/or aluminum compound coated or deposited thereon. The substrate particles may be heat treated in a gas atmosphere containing water vapor or in a non-reducing atmosphere. The addition of the boron compound may be carried out in various manners, for example, by mixing the substrate particles with a given amount of the boron compound by a mixing machine such as a ribbon mixer or twin-cylinder mixer or by a grinding and mixing method as described in Japanese Patent Application No. Hei 1-259190 filed by the present inventors. The boron compound added includes various boron compounds which are solid at room temperature, such as orthoboric acid, metaboric acid, boron oxide, ammonium borate, aluminum borate, zinc borate, lead borate, magnesium borate, manganese borate, and nickel boride. The amount of the boron compound added is usually such that the boron/iron weight ratio of 0.1/100–5.0/100, preferably 0.5/100–3.0/100. If this amount is smaller than the range above, the desired effect cannot be obtained and if it is more than the range above, the saturation magnetization is decreased. The treatment with the silicon compound and/or aluminum compound can be carried out by various known methods or a method described in Japanese Patent Application No. Sho 63-329838 (Japanese Patent KOKAI (Laid-Open) No. Hei 2-175806) filed by the present inventors.

The substrate particles to which the boron compound has ben added in the above-mentioned manner are preferably molded to pellets having a desired shape and size depending upon the type of apparatus used in the subsequent reduction step.

In the present invention, for substrate particles comprising a metal compound composed mainly of a hydrous iron oxide or iron oxide or these substrate particles to which the boron compound has been added, (1) the heat treatment in a gas atmosphere having a water vapor partial pressure of 10 mmHg or higher at a temperature of 350°–750° C. can be carried out by various methods. For example, an inert gas such as nitrogen, argon or helium or an oxidizing gas such as air is introduced into a humidifier and are humidified therein to prepare a mixed gas having a water vapor partial pressure of usually 10 mmHg or higher, desirably 15 mmHg or higher. Normally, the water vapor partial pressure of the mixed gas is sufficiently in the range of about 200 mmHg or less, but if it is lower than 10 mmHg, the effect desired by the present invention cannot be obtained. The heat treatment under the above-mentioned water vapor partial pressure is carried out while keeping a temperature range of usually 350°–750° C., preferably 400°–700° C., and if the temperature is lower than the range above, the effect desired by the present invention cannot be obtained. On the other hand, if the temperature is higher than the range above, hematite particles are sintered, so that the shape of the metal particles are apt to be damaged, whereby the coercivity and squareness of the magnetic metal powder is reduced, and orientability of metal particles in a magnetic recording medium is damaged. Furthermore, (2) the heat treatment in a non-reducing atmosphere, for example, air or an inert gas such as nitrogen, argon or helium, at a temperature of 550°–900° C., preferably 650°–850° C. may be carried out in combination with the above-mentioned heat treatment (1), so that the effect obtained in the above-mentioned heat treatment (1) can be further improved. That is, this heat treatment (2) allows the resulting hematite particles to be dense with few pores, thus obtaining a dense crystal, when fired, and inhibits the sintering and the deformation of the shape of the particles during the reduction. Thus, the magnetic metal powder obtained through the heat treatment (1) or heat treatments (2) secures a high recording density, and is very fine and excellent in saturation magnetization and coercivity, dispersibility and packing property. If the heat treating temperature is higher than the range above, deforming of the particle shape or coarsening of the particles occurs owing to intraparticle or interparticle sintering of hematite particles. If the heat treating temperature is lower than the range above, many pores remain in the particles, so that the particles do not comprise dense crystal and the shape of the particles is much damaged in the subsequent reduction step. Thus, the desired effect is hardly obtained.

The product obtained by the above-mentioned heat treatments is then reduced to produce the final product of the present invention. The reduction can be carried out by various known methods. Normally, substantially all iron oxides can be reduced to the metal by carrying out the heat treatment with a reducing gas, for example, hydrogen, at a temperature of 350°–600° C. The magnetic metal powder obtained by the reduction ignites upon contact with air, and, hence, the magnetic metal powder is stabilized by various known methods before exposing to the air. For example, one of these methods comprises dipping the magnetic metal powder in an organic solvent such as toluene, and then slowly evaporating the toluene to stabilize the powder. Another comprises passing an oxygen-containing gas through a liquid phase or gaseous phase containing magnetic metal powder, to stabilize the powder. A further method comprises the above-mentioned treatment together with a treatment for coating using various compounds to inhibit the oxidation. The thus obtained magnetic metal powder for magnetic recording are excellent in magnetic characteristics such as coercivity and saturation magnetization.

The present invention will be further explained below with reference to some examples and comparative examples.

EXAMPLE 1

On an acicular α-FeOOH powder having a specific surface area (BET method) of 90 m²/g, an average major axis of 0.18 μm and an axial ratio of 9 were deposited aluminum hydroxide (Al/Fe=4% by weight) and nickel hydroxide (Ni/Fe=1.0% by weight). 100 g of the resulting powder and 5.4 g of boric acid were ground and mixed by passing once through a Pin mill (manufactured by Nippon Seiki Co.) The resulting ground mixture was granulated and then 100 g of the resulting granules were charged into a 100 g horizontal rotary kiln and heat treated at 600° C. for 2 hours while passing therethrough nitrogen gas containing 24 mmHg of water vapor. Then, the heat treated product was charged in a muffle furnace and further heat treated at 700° C. for 2 hours in air. Thereafter, 50 g of this heat treated product was put in a vertical reactor and reduced at 450° C. in a hydrogen stream (10 1/min.) until the dew point of outlet gas reached −50° C. The resulting reduced product was cooled in a nitrogen stream and then dipped in toluene and thereafter the toluene was gradually evaporated at room temperature in air to obtain the desired magnetic metal powder (sample A).

EXAMPLE 2

Example 1 was repeated except that 650° C. was used in place of 600° C. as the heat treating temperature with nitrogen gas containing water vapor, thereby to obtain a magnetic metal powder (sample B).

EXAMPLE 3

Example 1 was repeated except that 7.2 g of boric acid was used in place of 5.4 g of boric acid and 150 mmHg was employed in place of 24 mmHg as water vapor partial pressure, thereby to obtain a magnetic metal powder powder (sample C).

EXAMPLE 4

Example 1 was repeated except that the ground mixture obtained by Pin mill was granulated, then 100 g of the resulting granules were heat treated at 700° C. for 2 hours in a muffle furnace and then, heat treated at 700° C. for 2 hours in a horizontal rotary kiln while passing therethrough nitrogen gas containing 24 mmHg of water vapor, thereby to obtain a magnetic metal powder (sample D).

COMPARATIVE EXAMPLE 1

Example 1 was repeated except that boric acid was not used, thereby to obtain a magnetic metal powder (sample E).

COMPARATIVE EXAMPLE 2

Example 1 was repeated except that the heat treatment with nitrogen gas containing water vapor was not carried out, thereby to obtain a magnetic metal powder (sample F).

Magnetic characteristics of the samples of magnetic metal powders obtained in the above Examples and Comparative Examples were measured by conventional methods.

Furthermore, magnetic paints were prepared by mixing and dispersing the following composition which contained the above samples. The resulting magnetic paint was coated on a PET film, subjected to orientation treatment and dried to make a magnetic tape with thickness of approximately 10 μm. Magnetic characteristics of this magnetic tape were measured by conventional methods.

| | |
|---|---|
| Magnetic metal powder | 5 parts by weight |
| Dispersant | 0.25 part by weight |
| Polyurethane resin (30% solution) | 2.96 parts by weight |
| Mixed solvent* | 13.4 parts by weight |

*Toluene/MEK/cyclohexanone (4.5/4.5/1)

These magnetic characteristics measured were coercivity (Hc: Oe), saturation magnetization (σs: emu/g), maximum induction (Bm: Gauss), squareness ratio (Rs, SQ), orientability (OR), and switching field distribution (SFD). Furthermore, saturation magnetization after standing in air for 1 week at 60° C. and at relative humidity 80% was measured and change of saturation magnetization (Δσs (%)) was calculated according to the following formula.

$$\Delta\sigma s(\%) = \frac{\sigma s - \sigma s'}{\sigma s} \times 100$$

(wherein σs is initial saturation magnetization and σs' is saturation magnetization after standing for 1 week).

Powder X-ray diffraction was measured for α-Fe (110) by GEIGERFLEX RAD 3A manufactured by Rigaku Denki Co. and Lc was obtained from the extent of width of the diffraction according to the following formula (Scherrer).

$$Lc(\text{Å}) = \frac{0.9 \times \lambda}{\beta \cos\theta}$$

wherein:
λ=1.54178 Å (CuKα)
β: Half-width of peak (radian)
θ: Bragg angle of —Fe (110)

Moreover, 60°–60° gloss of the above magnetic tapes was measured by a glossmeter.

These results are shown in the following table.

TABLE

| | Sample | Magnetic characteristics of powder | | | | | Magnetic characteristics of tape | | | | | Gloss |
|---|---|---|---|---|---|---|---|---|---|---|---|---|
| | | Hc (Oe) | σs (emu/g) | Rs (—) | Δσs (%) | Lc (Å) | Hc (Oe) | Bm (Gauss) | SQ (—) | OR (—) | SFD (—) | |
| Example 1 | A | 1419 | 122.8 | 0.491 | 34.4 | 135 | 1544 | 2717 | 0.816 | 2.10 | 0.514 | 107 |
| Example 2 | B | 1400 | 123.6 | 0.485 | 32.5 | 134 | 1550 | 2767 | 0.816 | 2.19 | 0.520 | 117 |
| Example 3 | C | 1402 | 123.9 | 0.503 | 30.9 | 129 | 1555 | 2785 | 0.833 | 2.22 | 0.515 | 112 |
| Example 4 | D | 1425 | 122.5 | 0.494 | 33.5 | 135 | 1565 | 2734 | 0.823 | 2.20 | 0.515 | 115 |
| Comparative Example 1 | E | 1139 | 124.0 | 0.476 | 35.0 | 150 | 1290 | 2817 | 0.791 | 2.04 | 0.642 | 104 |
| Comparative Example 2 | F | 1365 | 125.0 | 0.484 | 33.0 | 131 | 1488 | 2725 | 0.812 | 2.09 | 0.540 | 92 |

According to the present invention, there is obtained, by a relatively simple operation, a magnetic metal powder which is inhibited from intraparticle or interparticle sintering and deformation of particle shape and which has high coercivity and small Lc. This magnetic metal powder is good in dispersibility in magnetic recording media and has excellent characteristics such as squareness and orientability and besides, can lower noise. Thus, fine magnetic metal powder more suitable for high density recording can be efficiently produced and this is industrially a very advantageous process.

What is claimed is:

1. In a process for producing a magnetic metal powder suitable for magnetic recording, by reducing a metal compound composed mainly of hydrous iron oxides or iron oxides, the improvement which comprises, prior to reducing, adding a boron compound to the metal compound and then heat treating the metal compound with the boron compound added thereto in a gas atmosphere having a water vapor partial pressure of 10 mmHg or higher at a temperature of 600°–700° C.

2. The process according to claim 1, in which the metal compound is in the form acicular particles and the magnetic metal powder is also in the form of acicular particles.

3. The process according to claim 1, in which the gas atmosphere comprises an inert gas having a water vapor partial pressure of 10 mmHg or higher.

4. The process according to claim 1, in which the boron compound is boric acid.

5. The process according to claim 1, in which the metal compound is comprised of hydrous iron oxide in an acicular form having a specific surface area of 55 m²/g or higher and an average major axis length of 0.1–0.25 μm.

6. The process according to claim 1, in which the metal compound is comprised of iron oxides in an acicular form having a specific surface area of 40 m²/g or higher and an average major axis length of 0.1–0.25 μm.

7. The process according to claim 1, in which the metal compound has at least one of a silicon compound and aluminum compound coated or deposited thereon prior to reducing and before adding the boron compound.

8. The process according to claim 1, wherein said gas atmosphere is an inert gas comprising nitrogen, argon or helium, or air.

9. In a process for producing a magnetic metal powder by reducing a metal compound composed mainly of hydrous iron oxides or iron oxides, while heating, the improvement which comprises, prior to reducing, adding a boron compound to the metal compound, and then both (1) heat treating the compounds in a gas atmosphere having a water vapor partial pressure of 10 mmHg or higher at a temperature of 350°–750° C., and (2) heat treating the compounds in a non-reducing atmosphere at a temperature of 550°–900° C.

10. The process according to claim 9, which comprises thereafter reducing the heated metal compounds under heating.

11. The process according to claim 9, in which the metal compound is in the form of acicular particles and the magnetic metal powder is also in the form of acicular particles.

12. The process according to claim 9, in which the gas atmosphere comprises an inert gas having a water vapor partial pressure of 10 mmHg or higher.

13. The process according to claim 9, in which the boron compound is boric acid.

14. The process according to claim 9, in which the metal compound is comprised of hydrous iron oxide in an acicular form having a specific surface area of 55 m²/g or higher and an average major axis length of 0.1–0.25 μm.

15. The process according to claim 9, in which the metal compound is comprised of iron oxide in an acicular form having a specific surface area of 40 m²/g or higher and an average major axis length of 0.1–0.25 μm.

16. The process according to claim 9, wherein the heat treatment in the presence of water vapor is carried out at a temperature of 400° to 700° C.

17. The process according to claim 9, wherein said gas atmosphere is an inert gas comprising nitrogen, argon or helium, or air.

18. The process according to claim 9, wherein the heat treatment in the presence of water vapor is carried out at a temperature of 600° to 700° C.

19. The process according to claim 9, in which the metal compound has at least one of a silicon compound and aluminum compound coated or deposited thereon prior to reducing and before adding the boron compound.

* * * * *